United States Patent [19]
Fere et al.

[11] Patent Number: 4,844,935
[45] Date of Patent: Jul. 4, 1989

[54] PROCESS FOR PREPARING A FOOD PRODUCT BASED ON A THIN PASTE

[75] Inventors: Guy Fere, Unieux; Daniel Jouve, Lyons, both of France

[73] Assignee: Clextral, Paris la Defense, France

[21] Appl. No.: 71,234

[22] Filed: Jul. 9, 1987

Related U.S. Application Data

[63] Continuation-in-part of Ser. No. 45,731, May 4, 1987, abandoned, and a continuation-in-part of Ser. No. 835,661, May 3, 1986, abandoned.

[30] Foreign Application Priority Data

Mar. 4, 1985 [FR] France .................. 85 03121

[51] Int. Cl.$^4$ .............................................. A23P 1/12
[52] U.S. Cl. .................................. 426/549; 426/516; 426/615
[58] Field of Search ................ 426/448, 516, 615, 549

[56] References Cited

U.S. PATENT DOCUMENTS

| | | | |
|---|---|---|---|
| 3,886,299 | 5/1975 | Feldbrugge | 426/448 |
| 3,908,025 | 9/1975 | Miller | 426/448 |
| 3,950,564 | 4/1976 | Puski | 426/516 |
| 4,020,187 | 4/1977 | McCullock | 426/516 |
| 4,143,169 | 3/1979 | Skoch | 426/448 |
| 4,162,336 | 7/1979 | Brown | 426/448 |
| 4,185,123 | 1/1980 | Wenger | 426/516 |
| 4,225,630 | 9/1980 | Pitchon | 426/620 |
| 4,251,558 | 2/1981 | Kobayaski | 426/448 |
| 4,609,557 | 9/1986 | Mao | 426/549 |
| 4,732,775 | 3/1988 | Millauer | 426/516 |
| 4,748,037 | 5/1988 | Matsumoto | 426/448 |

OTHER PUBLICATIONS

Montagne, 1978 The New Larousse Gastronomique, Crown Publishers, New York, pp. 663 and 754.
Child, 1974, Mastering the Art of French Cooking, A. A. Knopf, New York, pp. 184–190.

*Primary Examiner*—Donald E. Czaja
*Assistant Examiner*—Carolyn Paden
*Attorney, Agent, or Firm*—Pollock, Vande Sande & Priddy

[57] ABSTRACT

The process for continuously preparing a food product constituted by a thin paste based on a plant product contributing starch includes the steps of introducing at the upstream end of a screw conveyor the plant product with a liquid phase, kneading and grinding, cooking the mix at a temperature between 80° C. and 110° C. with kneading, introducing eggs, fatty substances and products of animal or plant origin essentially containing proteins, homogenization and fine grinding of the mix, and extruding the mix through a die placed at the downstream end of the screw conveyor.

3 Claims, 2 Drawing Sheets

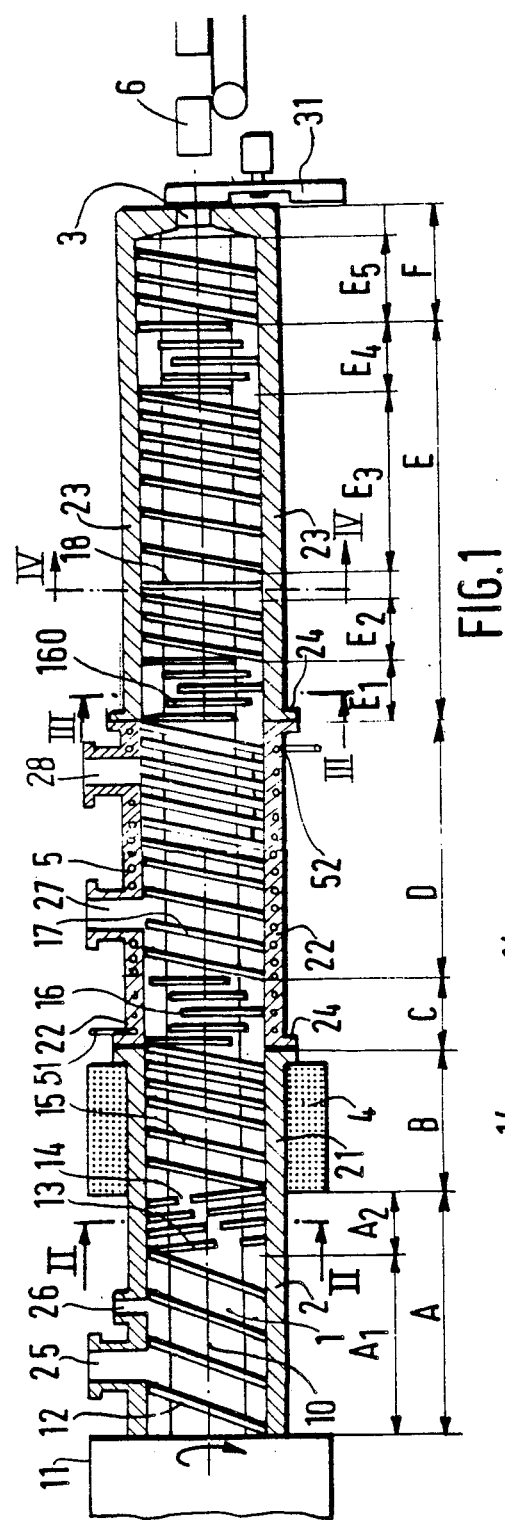
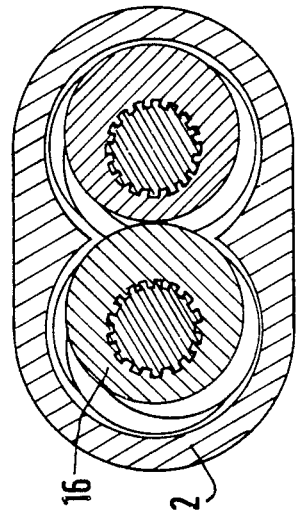
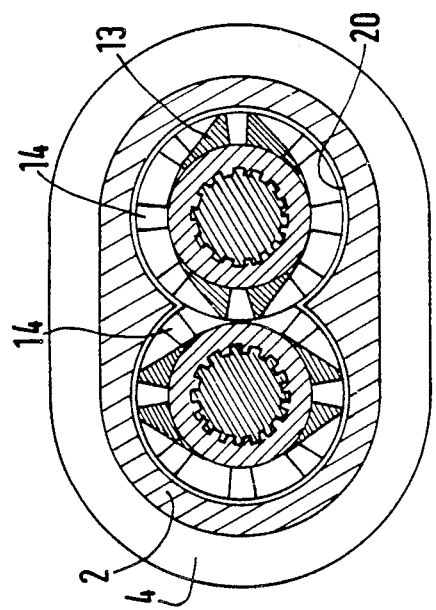

PROCESS FOR PREPARING A FOOD PRODUCT BASED ON A THIN PASTE

CROSS-REFERENCE TO RELATED APPLICATIONS

This is a continuation in part of U.S. patent application Ser. No. 045,731, filed May 4, 1987 (abandoned) which is a continuation of U.S. patent application Ser. No. 835,661, filed Mar. 3, 1986 (abandoned).

FIELD OF THE INVENTION

The invention relates to a process for the preparation of a food product similar to a "quenelle", constituted by a thin paste based on a plant product supplying starch, in which at least one additional substance is incorporated. The invention also relates to the food products prepared according to the process.

BACKGROUND OF THE INVENTION

A food product called a "quenelle", made from a thin and moist paste mixed with additives such as fish, meat, poultry or vegetables, has long been known. When prepared in the conventional way, the basic paste, also known as a a "panade", is made by cooking a cereal flour and/or semolina in an aqueous medium. The flour and the liquid phase consisting of water and/or milk is kneaded and cooked in a paste kneader/steamer, and the proportions can be, for example, 50 liters of water per 50 kg of flour and/or semolina. The cooking must be carried out over a fairly long period to produce sufficient dehydration of the substance with expansion of the starches, and can take from three to five hours. The bread soup thus obtained is then mixed with meat or plant substances and/or, if appropriate, fatty substances and egg. Pre-cooking makes it possible to stabilize the product, which can be extruded in the form of elongate round bars 5 to 20 cm long which can be kept for 5 to 6 days at a fairly low temperature, the final cooking being produced merely by poaching.

Because of the relative difficulty of the preparation and especially of the cooking time, the quenelle has remained, by and large, a luxury product, and this conventional method of preparation has been practically given up and is still being used only in small-scale production in some regions. At the present time, in fact, the basic paste is made industrially by preliminary drying of a wheat flour for several hours in continuous ovens, the dried flour being then mixed with the required quantity of a liquid phase. This industrial process remains fairly time-consuming and can be used, in practice, only with wheat flours, since semolinas are especially likely to run the risk of scorching before the starch has burst.

SUMMARY OF THE INVENTION

An object of the invention is to develop an industrial process for the preparation of products of the "quenelle" type in which the traditional preparation process is followed as closely as possible, but without incurring its disadvantages, the basic paste and the final product being produced continuously and rapidly. In this process, it is possible, as in the traditional process, to use not only wheat flours, but also other types of cereals and in particular semolinas. However, it is also possible to use other plant products which contribute starch, and even proteinaceous or oleaginous products such as beans, cassava, corn, ground-nut, soya-bean, etc.

This basic preparation, traditionally called "panade" and consisting in creating a network of proteins and glycolipids around starch granules, is somewhat similar to the principle of panification.

The cooking of this "panade" requires such conditions that the starches are completely gelatinized.

To produce in a continuous and rapid, and consequently inexpensive manner, the "quennelle" products having the characteristics of a complete food, which is easily assimilated and whose composition and taste are the subject of many combinations, there are added to this "panade", the complementary ingredients constituted by eggs, fatty substances and possibly products of animal or plant origin containing essentially proteins.

The process according to the invention for the continuous preparation of a food product constituted by a thin paste based on a plant product supplying starch comprises:

introducing at the upstream end of a screw conveyor comprising an elongate barrel surrounding at least two screws driven in rotation and provided with means for regulating the temperature of the driven material, the plant product supplying the starch, with a liquid phase or addition products, the water content of this mix being between 20% and 45%, effecting in a first section of said screw conveyor kneading and grinding of the paste, cooking the mix in a second section of said screw conveyor at a temperature between 80° C. and 110° C. while kneading under pressure until the starch seeds of the plant product burst and a gelatinized paste is obtained, kneading and grinding the gelatinized paste in a third section of said screw conveyor while cooling the ground paste to a temperature at most equal to 60° C., introducing continuously in a fourth section of the screw conveyor eggs in a predetermined proportion, then kneading the paste, and simultaneously cooling the paste so as to maintain the temperature of the paste at no more than 60° C., introducing continuously and in a predetermined proportion in said fourth section of the screw conveyor fatty materials and products of animal or plant origin essentially containing proteins, and simultaneously kneading the paste, homogenizing and fine grinding the mix to a predetermined degree of fineness in a fifth section of said screw conveyor, and then extruding said mix through a die placed at the downstream end of said screw conveyor.

According to an essential characteristic, after incorporation and mixing of the additional substance with the gelled paste, the mix is subjected to a process of homogenization and fine grinding which is continued until the product has a specified degree of fineness. In fact, as will be seen later, because of their flexibility in use, the process and the device used make it possible to adjust the degree of fineness of the product at will and, as a result, to produce products of all kinds, such as very fine quenelles.

The device according to the invention, for implementing the process, consists of a screw conveyor comprising at least two intermeshed conveying screws driven in rotation inside an elongated barrel, and each consisting of mutually adjoining sections fitted with specific conveying and processing members and determining consecutive zones corresponding to the consecutive steps of preparation of the product and comprising, respectively, at least:

a conveying and mixing zone equipped with coarse-pitched helical flights into which zone there open orifices which feed a liquid-phase plant product and are arranged in the barrel, a zone for cooking and kneading under pressure, fitted with flights whose pitch becomes gradually finer and in which the barrel is fitted with devices for heating the conveyed substance, a grinding zone fitted with eccentric kneading discs, a zone for cooling the paste and effecting a first incorporation of an additive constituted by eggs, in which the barrel is provided with an introduction orifice and means for cooling said paste to a temperature at most equal to 60° C., a zone for kneading and grinding and effecting a second and optionally a third incorporation of additives respectively constituted by fatty substances and products of animal or plant origin, essentially containing proteins, in which the barrel is provided with at least two orifices for introducing the additives, a zone for the homogenization and the fine grinding of the mix to a predetermined degree of fineness, a compression zone including a finer pitch immediately upstream of an extrusion die for the product placed at the downstream end of the barrel.

The homogenization zone is advantageously constituted by perforated discs interposed across the barrel and provided with a plurality of orifices for the passage of the product, whose section is determined as a function of the degree of fineness to be obtained.

This zone for homogenizing and adjusting the degree of fineness can also include a series of consecutive processing sections fitted with members for chopping and rolling the paste, the nature and the number of which are determined as a function of the degree of fineness to be obtained. Thus, the paste can pass consecutively through a compression zone fitted with flights whose pitch becomes finer from the upstream end to the downstream end, a chopping section fitted with eccentric kneading discs and a rolling section fitted with reverse-hand flights and comprising openings for a controlled downstream passage of the product.

The process and the device according to the invention make it possible to produce products which are similar to quenelles from ingredients, which, until now, were not used in products of this kind.

As a general rule, the product according to the invention can be made from the following ingredients:

from 20 to 40% of a plant product contributing starch and milled in the form of flour or semolina, from 5 to 25% of a liquid phase such as water or milk, or water in the form of steam, 8 to 25% of eggs, 0 to 25% of products of animal or plant origin essentially containing proteins, 6 to 16% of fatty substances, 0 to 5% of milk products, 0 to 2% of seasoning.

In a particularly advantageous manner, the basic paste comprises, in a proportion on the order of 20%, at least one of the products from the group consisting of proteinaceous and oleaginous plants such as beans, cassava flour, corn, peanut, soya-bean.

BRIEF DESCRIPTION OF THE DRAWINGS

The invention will be better understood from the following description of an embodiment thereof, with reference to the attached drawings.

FIG. 1 shows a device for carrying out the process, in longitudinal section through the axis of the screw.

FIGS. 2, 3 and 4 are cross-sections, on a larger scale, respectively along lines II, II, III, III and IV, IV of FIG. 1.

DESCRIPTION OF PREFERRED EMBODIMENT

Figure 4:
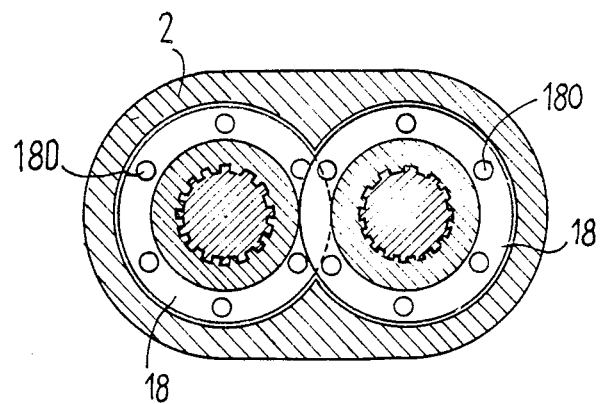

The device consists of a screw conveyor comprising, as a general rule, at least two screws 1 driven in rotation around their axes 10 inside a barrel 2 which encloses them. Advantageously, the two screws are driven in rotation in the same direction and are equipped with identical flights (or other peripheral members) which intermesh, the inner face 20 of the barrel consisting of two secant cylindrical lobes which enclose the two screws. The latter are driven in rotation around their axes 10 by a geared motor unit 11.

The screws 1 are equipped with various processing members on their periphery, and especially helical flights of various pitches which determine, as a rule:

a first part A for feeding and mixing the starting ingredients, a second part B for cooking the ingredients until the starches gel, a third part C for grinding the gelled paste, a fourth part D for cooling and incorporating additives, and a fifth part E for homogenizing and regulating the degree of fineness of the product.

Advantageously, the barrel can consist of three consecutive parts 21, 22, 23 which are connected by flanges 24 and which correspond, respectively, to the parts A and B, C and D, E and F of the machine in which the various treatments can be carried out.

The screws consist advantageously of splined shafts on which there are stacked screw lengths consisting of sleeves whose inner part is equipped with splines corresponding to those on the shaft and whose outer part is equipped with flights of varied pitches or other peripheral members for processing and conveying. A fairly large number of lengths can be made available, making it possible to vary the pitch, the depth and the number of flights, as well as the length of each zone.

In the example shown, the screws are made up as follows:

In the first part A for feeding and mixing the ingredients, the barrel 2 is fitted with orifices 25 and 26 for introducing the plant product supplying the starch and the liquid phase, respectively. In the first section A1, the screws are equipped with coarse-pitch flights 12, which quickly convey downstream the plant product introduced in the form of flour by the orifice 25, the latter opening out widely over the two screws to facilitate the distribution of the flour into the flights. The liquid phase, formed by water or water in the form of steam or a milk product, is normally introduced under pressure via a line connected to the orifice 26. However, in some cases, it will be possible to introduce the liquid phase directly via the flour supply orifice 25. The ingredients are thus immediately conveyed downstream and mixed by the rotating and intermeshing action of the screws. This mixing effect can be increased by the use of a section A2 fitted with reverse-hand flights 13, in which openings 14 are arranged which, as can be seen in the cross-section in FIG. 2, extend radially from the screw shaft to the periphery of the flight and are, futhermore, distributed uniformly around the axis, the screws being keyed so that two openings 140 coincide periodically in the central meshing zone. This controls the travel of the material in the downstream direction at a controlled rate, which determines a braking zone A2 and, as a result of this, a compression in the downstream part of the zone A1. This produces an intensive kneading action which promotes mixing of the ingredients.

The mix thus produced then passes into the cooking zone B. In the latter, the screws are fitted with flights 15 with a direct pitch, which can advantageously become finer in the downstream direction. This results in the material being conveyed with kneading and, in this zone, the barrel is surrounded by a heating jacket 4 which can be an enclosure carrying a heat-transfer fluid or an electrical, for example induction, heating device.

As a result of this, the mixed ingredients, whose temperature has already been raised in the zone A2 owing to the frictional effect, can be heated to a high temperature, for example above 200° C. In fact, the kneading effect produced by the screws, especially when they are being driven in the same direction, together with the pressure increase in the material, makes it possible to raise its temperature to a very high level, while the danger of scorching is being controlled. This level will depend on the material, of course.

For example, the cooking temperature must be between 140° C. for a breadmaking paste, 160° C. for a hard wheat semolina, 150° C. for a mixture of flour and semolina and 160° C. for a cassava flour. However, in some cases, it will be possible to raise the temperature above 200° C., for example to about 240° C. The use of a reverse-hand zone A2 upstream of the cooking zone B makes it possible to produce a continuous plug of material which resists the release of steam through the feed orifice 25, water thus remaining present under pressure inside the mix while it is being cooked. By virtue of the high water content of the mix and the high cooking temperature, rapid bursting of the granules of starch in the plant product is produced in the cooking zone B.

Thus, a gelled paste leaves at the downstream end of this zone and passes immediately into a grinding zone C consisting, as shown in FIG. 3, of eccentric kneading discs which permit the paste to travel in the downstream direction with a rolling action between the discs and the barrel.

Ground in this way, the paste can be subjected more readily to a cooling action in a cooling zone D in which the barrel is fitted, for example, with a cooling circuit 5 consisting of channels provided inside the barrel and carrying a heat-transfer fluid circulating between an inlet orifice 51 and an outlet orifice 52. The pressure in the ground paste is released upstream of the cooling zone D in course-pitch flights 17 which permit the paste to travel in the downstream direction in a thin layer, with a paste-turning action as it passes from one screw to the other in the meshing zone. A temperature-homogenizing effect is thus produced, which promotes very fast cooling from the very beginning of the zone D.

Furthermore, the barrel is equipped with an orifice 27 for introducing the additional substances, constituted by eggs, which is located downstream of the start of the cooling zone D at a sufficient distance so that, at the time of the introduction, the paste temperature has come down to a sufficiently low level to permit the additional substances to be introduced without a risk of cooking; this temperature can be about 60° C., for example.

The barrel 22 is provided with another orifice 28 for introducing additional materials constituted by fatty materials and by products of animal or plant origin, essentially containing proteins, located on the downstream side of the orifice 27 at sufficient distance to ensure that, at the moment of introduction, the previously-prepared mix is homogeneous.

Downstream of the orifice 28 for introducing the additional materials, the pitch of the flights 17 becomes finer so as to increase the kneading action, to promote the mixing of the paste with the additives.

The conditions under which the mixing is carried out depend, furthermore, on the intended result.

For example, in the case where pâtés are being produced, it will be sufficient to mix the pieces of meat well with the gelled paste prepared earlier in the upstream part of the machine. However, in the majority of cases, the intention will be to produce finer pastes, similar to the quenelle and, in this case, the mix will have to be subjected to a homogenizing effect in a new zone E of the machine. This zne also consists of a certain number of screw members placed side by side and located inside a third barrel member 23 coupled to the member 22.

The homogenization zone can comprise, for example, a section E1 consisting of eccentric kneading discs 160, in which the mix is subjected to a grinding action with rolling, and then a finer-pitch section E2 in which a compression is produced, which enables the mix to be passed through perforated plates 18 which permit very fine grinding to take place. To this end, the perforated plates 18, inserted inside the barrel in a plane transverse to the axis of the screws, are equipped with a plurality of orifices 180 whose cross-section is determined as a function of the degree of fineness to be produced.

Thereafter, the mix spreads into a new kneading section E3, provided with flights whose pitch becomes finer in the downstream direction. The paste can then pass into a new section E4 equipped with eccentric kneading discs, in which it is subjected to a last grinding action with rolling, and it is then taken up by a fine-pitch section E5 which enables pressure to be increased in order to effect an extrusion through the die 3 situated at the downstream end of the barrel. The die 3 makes it possible to give the required shape to the product which is extruded in the shape of a sausage cut into units 6 by a cutter 31 placed on the downstream face of the barrel 2.

The process whose general principles have just been described offers many advantages.

It may be noted, for example, that, because of the high temperature rise produced under pressure in the cooking zone, there is obtained a sterilization effect which is maintained up to the outlet of the machine if, at least, the additional substances introduced through the orifice 26 are themselves sterilized.

However, the essential advantage of the process resides in its flexibility of use and the large variety of products which may be obtained, these products being, for example, conventional products or completely new products produced from raw materials which, up to the present time, could not be exploited with advantage in this way.

In a general way, the starting ingredients introduced through the orifices 25 and 26, 27 and 28, for producing the basic paste may comprise:

20 to 40% of a cereal or other plant substance contributing starch, 5 to 25% of a liquid phase which may be water or milk, or water in the form of steam, 8 to 25% of eggs, 0 to 25% of products of animal or plant origin, essentially containing proteins, 6 to 16% of fatty substances, 0 to 5% of milk products, such as a caseinate or a milk whey, 0 to 2% of seasoning.

The products of animal origin may be, for example, constituted by poultry, pike or veal, or by various fresh water fishes, and the products of plant origin may be, for example, constituted by flour or concentrates from which oil has been removed, or by field-bean flour.

In order to obtain, by the process described hereinbefore, "quenelle" products, there is first of all produced in the first section of the screw conveyor a gelatinization of the starches by cooking in a hydrated medium at a temperature of the material between 80° C. and 110° C. for a breadmaking flour, a hard wheat semolina, a mix of flour and semolina and cassava flour.

The cooking time and the temperature are so determined as to avoid the bursting of the starch granules by a prolonged hydrothermal treatment and a partial hydrolysis and the more or less complete solution of the constituent molecules. In this way, the constitution of a gel which is termed "retrogradation" is avoided.

This first phase permits the preparation of the paste termed "panade".

In the second section of the screw conveyor, and after cooling of the barrel, to obtain a paste at 60° C., there are introduced the eggs which are absorbed by the panade in the course of the kneading.

In the third section of said screw conveyor, there are introduced the fatty substances and the products of animal or plant origin which are homogenized upon the passage through the perforated discs and before extrusion.

By way of an example, it was possible to produce in a machine of the previously-described type "quenelle" products from the ingredients mentioned hereinunder. The indicated percentages correspond to the percentages of the ingredients relative to the finished prepared product.

| First example: quenelle | |
|---|---|
| breadmaking flour type 55 | 40% |
| water | 9.33% |
| fatty substances | 16% |
| eggs | 18.5% |
| product of animal origin | 13% |
| milk products | 1.67% |
| seasoning | 1.5% |
| Second example: pike quenelle | |
| breadmaking flour type 55 | 12% |
| hard wheat semolina | 16.6% |
| pike filet and/or flesh | 20% |
| butter | 17% |
| whole eggs | 18% |
| egg white | 8.33% |
| water | 6.4% |
| seasoning | 1.67% |
| Third example | |
| cassava flour | 50% |
| water | 12.5% |
| whole eggs | 20% |
| palm oil | 13% |
| proteins of textured soya-bean | 3% |
| seasoning | 1.5% |

What is claimed is:

1. A process for preparing continuously a food product constituted by a thin paste based on a plant product contributing starch, said process comprising the steps of
   (a) introducing at an upstream end of a screw conveyor, comprising an elongated barrel surrounding at least two screws driven in rotation and provided with means for regulating the temperature of the driven material, the plant product, constituted by flour or semolina, forming a paste with water or milk, the water content of the resulting mix being between 20% and 45%;
   (b) kneading and grinding the paste in a first section of said screw conveyor;
   (c) cooking in a second section of said screw conveyor the paste at a temperature between 80° C. and 110° C. with kneading under pressure until the grains of starch of the plant product burst and a gelatinized paste is obtained;
   (d) kneading and grinding the gelatinized paste in a third section of said screw conveyor and simultaneously cooling the ground paste to a temperature equal to no more than 60° C.;
   (e) continuously introducing in a fourth section of said screw conveyor eggs in a predetermined proportion, then kneading the paste, and simultaneously cooling the paste for maintaining a temperature of the paste which does not exceed 60° C.;
   (f) introducing continuously and in predetermined proportions in said fourth section of the screw conveyor fatty substances and proteins of animal or plant origin, and simultaneously kneading the paste;
   (g) homogenizing and fine grinding the paste in a fifth section of said screw conveyor to a predetermined degree of fineness; and
   (h) extruding said paste through a circular die placed at the downstream end of said screw conveyor, to form elongate round bars.

2. A process according to claim 1, comprising introducing, during step (f), said fatty substances and proteins, downstream of said introduction of eggs and at a sufficient distance to ensure, at the moment of said introduction, that the previously-produced mix of eggs and paste is homogeneous.

3. A process according to claim 1, comprising homogenizing the paste by means of perforated discs placed across the barrel and provided with orifices of predetermined section for passage of the paste for obtaining the desired degree of fineness.

* * * * *